United States Patent [19]

Watanabe

[11] Patent Number: 5,072,088
[45] Date of Patent: Dec. 10, 1991

[54] WIRE CUT ELECTRIC DISCHARGE MACHINING METHOD

[75] Inventor: Naoki Watanabe, Aichi, Japan

[73] Assignee: Mitsubishi Denki K.K., Tokyo, Japan

[21] Appl. No.: 426,654

[22] Filed: Oct. 26, 1989

[30] Foreign Application Priority Data

Oct. 27, 1988 [JP] Japan ................................ 63-269593

[51] Int. Cl.$^5$ .............................................. B23H 7/06
[52] U.S. Cl. ............................ 219/69.12; 364/474.29
[58] Field of Search .......................... 219/69.12, 69.18; 364/474.04, 474.29

[56] References Cited

U.S. PATENT DOCUMENTS

| 4,700,314 | 10/1987 | Kinoshita | 219/69.17 |
| 4,703,146 | 10/1987 | Kinoshita | 219/69.12 |
| 4,713,517 | 12/1987 | Kinoshita | 219/69.12 |
| 4,843,203 | 6/1989 | Gamo et al. | 219/69.12 |

FOREIGN PATENT DOCUMENTS

| 56-62728 | 5/1981 | Japan | 219/69.17 |
| 102433 | 8/1981 | Japan | 219/69.12 |
| 61-49052 | 10/1986 | Japan . | |
| 61-49053 | 10/1986 | Japan . | |
| 62-69302 | 3/1987 | Japan . | |

*Primary Examiner*—Geoffrey S. Evans
*Attorney, Agent, or Firm*—Sughrue, Mion, Zinn, Macpeak & Seas

[57] ABSTRACT

A taper machining method in a wire cut electric discharge machine to permit machining a non-tangent-circle-arc based upon the workpiece thickness at first and second machining loci and upon the wire inclination angles.

4 Claims, 4 Drawing Sheets

WIRE CUT ELECTRIC DISCHARGE MACHINING METHOD

BACKGROUND OF THE INVENTION

This invention relates to a taper-machining method for use in a wire cut electric discharge machining apparatus in which a workpiece is machined with a wire electrode inclined to form a tapered surface in the workpiece.

FIG. 1 is an explanatory diagram illustrating the arrangement of a conventional wire cut electric discharge machining apparatus. In FIG. 1, reference numeral 1 designates a wire-shaped electrode; 2, an upper wire guide for guiding the wire-shaped electrode 1; 3 and 4, drive units for driving the wire guide 2 in a U-axis direction and in a V-axis direction, respectively; 5, a lower wire guide; 6, a wire supplying reel; 8, a wire winding reel; 9, a wire winding guide roller; 10, a workpiece supported by a movable table 11 between the upper and lower wire guides 2 and 5; and 12 and 13, drive units for driving the movable table 11 in an X-axis direction and in a Y-axis direction, respectively.

FIGS. 2(a) through 3(c) show examples of a workpiece which has been machined by the wire cut electric discharge machining apparatus described above. More specifically, FIGS. 2(a) through 2(c) show an example of a workpiece which has been taper-machined into a substantially circular truncated cone (hereinafter referred to as "a first taper-machining method", when applicable). In contrast, FIGS. 3(a) through 3(c) show an example of a workpiece which has been taper-machined according to a method of taper-machining a workpiece in such a manner that it has the same radius at the corners of the upper and lower surfaces thereof (hereinafter referred to as "a second tapering-machining method", when applicable). In these figures, the parts (a), (b) and (c) are a top view, a front view, and a bottom view showing the taper-machined workpiece, respectively.

FIG. 4 is a schematic diagram illustrating a sectional view of the workpiece being taper-machined. In FIG. 4, reference character t represents the thickness of a workpiece 10; $\theta_i$, the inclination angle of the wire-shaped electrode 1 with respect to the vertical line (hereinafter referred to as "a wire inclination angle", when applicable); and $t_i$, the horizontal distance between the machining locus of the upper surface 10a of the workpiece 10 and that of the machining locus of the lower surface 10b. The horizontal distance, corresponding to the wire inclination angle $\theta_i$ and the thickness t of the workpiece 10, represents the taper offset.

FIG. 5 is a schematic diagram showing a machining loci in the aforementioned second taper-machining method. In FIG. 5, reference numeral 20 designates a first straight part; 21, an arcuate part merging with the first straight part; and 22, a second straight part merging with the arcuate part 21. Further in FIG. 5, reference character $l_1$, $c_1$ and $l_2$ designates a first straight locus, an arcuate locus, and a second straight locus, respectively, which define the lower source 10b of the workpiece; and $l_3$, $c_2$, and $l_4$, a first straight locus, an arcuate locus, and a second straight locus, respectively, which define the upper surface 10a of the workpiece. Further in FIG. 5, reference character $O_1$ and $O_2$ designate the centers of the arcuate loci $c_1$ an $c_2$, respectively; r, the radius of the arcuate loci $c_1$ and $c_2$; and $t_1$ and $t_2$, the taper offsets of the first and second straight parts 20 an 22, which are represented by the following equations, respectively:

$$t_1 = t \times \tan \theta_1$$

$$t_2 = t \times \tan \theta_2$$

where t is the thickness of a workpiece, and $\theta_1$ and $\theta_2$ are the wire inclination angles of the first and second straight parts, respectively.

Further in FIG. 5, reference characters $g_1$ and $g_2$ designate grooves formed in the upper and lower surfaces of the workpiece when the wire-shaped electrode 1 is moved.

The operation of the wire cut electric discharge machining apparatus will be described.

In a wire cut electric discharge machining operation, as is well known in the art, first the drive units 12 and 13 are operated to drive the movable table 11 to move the workpiece 10 with respect to the wire-shaped electrode 1, to machine it as required. On the other hand, by operating the drive units 3 and 4 of the upper wire guide 2 in synchronization with the drive units 12 and 13 of the movable table 11, a sloped surface can be formed on the workpiece; that is, the latter is taper-machined. This taper-machining method is practiced as the aforementioned first taper-machining method in which a workpiece is taper-machined into a substantially circular truncated cone, or as the aforementioned second taper-machining method in which a workpiece is taper-machined to have the same radius at the corners of the upper and lower surfaces. In the second taper-machining method, the machining grooves are constant in the upper and lower surfaces of the workpiece 10 (because the corners of the upper and lower surfaces are machined at the same speed, and accordingly in a given period of time the amount of machining of the upper surface is equal to the amount of machining of the lower surface). Hence, the second taper-machining method is essential for provision of taper angles with high accuracy.

The second taper-machining method will be described with reference to FIG. 5 in more detail.

As is disclosed, for instance, by Published Examined Japanese Patent Application No. 49053/1961, in the second taper-machining method, in order to obtain the arc of the workpiece upper surface which corresponds to the arcuate part 21 merging with the first and second straight parts 20 and 22 of the workpiece upper surface, first the first and second straight loci $l_3$ and $l_4$ of the workpiece upper surface are obtained which are spaced the taper offsets $t_1$ and $t_2$ from the first and second straight loci $l_1$ and $l_2$, respectively, and then the arcuate locus $c_2$ of the workpiece upper surface which is tangent to the loci $l_3$ and $l_4$ is obtained. Therefore, in the arcuate loci $c_1$ and $c_2$ of the workpiece upper and lower surfaces, with the arc start point $A_1$ and $A_2$ referred to each other, and with the arc end points $B_1$ and $B_2$ referred to each other, the first straight part 20 is machined. That is, the wire inclination angle is gradually changed until the wire-shaped electrode 1 reaches the arc start point $A_1$ and $A_2$ of the arc loci $c_1$ and $c_2$ at the same time. After the wire-shaped electrode 1 has reached the arc start points $A_1$ and $A_2$, with the wire inclination angle maintained unchanged the taper-machining operation for formation of the arcuate part 21 is continued until the wire-shaped electrode 1 moving along the arcuate loci $c_1$ and $c_2$ (having the same radius) reaches the arc end points $B_1$ and $B_2$ thereof.

Thereafter, for the second straight part 22, the taper-machining operation is started from the arc end points $B_1$ and $B_2$ while the wire inclination angle being changed gradually. Thus, in the workpiece, the arc machining loci of the upper and lower surface are equal to each other, and accordingly the machining speeds of the upper and lower surfaces are equal, and the machining grooves are constant in width.

The second taper-machining method disclosed by the above described Publication No. 49053/1986 is provided only for the arc of the corner part between two straight parts which is tangent to the two straight lines (hereinafter referred to as "a tangent-circle-arc", when applicable); that is, the method can not be employed without obtaining the points of the straight lines to which the arc is tangent, and the center position and the radius of the arc. In practice, sometimes it is required to machine a workpiece to form a configuration, such as a curve bent inwardly or outwardly, which is different from the tangent-circle-arc (hereinafter referred to as "a non-tangent-circle-arc", when applicable). In this case, it is impossible for the above-described machining technique to univocally define the connection points of the arc and the straight lines, and the center position and the radius of the arc. Therefore, in machining a workpiece to form a non-tangent-circle-arc by the second taper-machining method, other intricate taper-machining methods in which the upper and lower surfaces are optional in configuration must be employed.

SUMMARY OF THE INVENTION

Accordingly, an object of the present invention is to eliminate the above-described difficulties accompanying a conventional wire cut electric discharge machining method. More specifically, an object of the invention is to provide a wire cut electric discharge machining method which allows the second taper-machining method to handle not only a tangent-circle-arc but also a non-tangent-circle-arc.

In a wire cut electric discharge machining method according to the present invention, for instance in order to obtain machining loci $l_3$, $c_2$ and $l_4$ of the upper surface of a workpiece, the intersection $P_1$ of machining loci $l_1$ and $l_2$ defining the lower surface is obtained, and the machining locus $l_3$ of the upper surface is obtained at the position which is spaced as much as a taper offset $t_1$ from the machining locus of the lower surface, and similarly the machining locus $l_4$ is obtained at the position which is spaced as much as a taper offset $t_2$ from the machining locus $l_2$. Thereafter, the intersection $P_2$ of the machining loci $l_3$ and $l_4$ defining the upper surface is obtained, and a vector $P_1P_2$ directed from the intersection $P_1$ to the intersection $P_2$ is determined. By using the vector thus determined, the end point of the machining locus $l_3$ of the upper surface (or the start point of the arcuate locus $c_2$) and the start point of the machining locus $l_4$ (or the end point of the arcuate locus $cz$) are obtained. In other words, the point $A_2$ is located at the position which is away from the point $A_1$ of the machining locus of the workpiece lower surface (or the end point of the machining locus $l_1$ or the start point of the arcuate locus $c_1$) as much as the sealer quantity of the vector $P_1P_2$ in parallel with it, and similarly the point $B_2$ is located at the position which is spaced from the point $B_1$ (or the end point of the arcuate locus $c_1$ or the start point of the machining locus $l_2$). Furthermore, in the workpiece upper surface, the center $O_2$ of the arcuate locus $c_2$ is located at the position which is away from the center $O_1$ of the arcuate locus $c_1$ as much as the scalar quantity of the vector $P_1P_2$ in parallel with it. Thus, the first machining part is formed with the wire inclined gradually until the wire-shaped electrode reaches the start points $A_1$ and $A_2$ at the same time. In formation of the arcuate part, the wire-shaped electrode is moved in such a manner that it described the same locus both in the upper and lower surfaces of the workpiece. Thereafter, the second machining part is formed with the wire inclination angle changing gradually.

In the method of invention, the intersections $P_1$ and $P_2$ of the machining loci $l_1$ through $l_4$ defining the upper and lower surfaces of the workpiece are obtained, and the arcuate locus $c_2$ of the upper surface is shifted from the arcuate locus $c_1$ of the lower surface as much as the scalar quantity of the vector $P_1P_2$ in the direction of the latter, so that the arcuate loci $c_1$ and $c_2$ of the lower and upper surfaces are equal to each other in arc open angle and arc start angle. Hence, the method of taper-machining a workpiece in such a manner that it has the same radius at the corners of the upper and the lower surface thereof can be practiced not only in the case where an arc between two straight lines is a tangent-circle-arc, but also in the case where it is a non-tangent-circle-arc.

BRIEF DESCRIPTION OF THE DRAWINGS

In the accompanying figures.

DESCRIPTION OF THE PREFERRED EMBODIMENTS

An embodiment of the present invention will be described with reference to the accompanying drawings.

Figure 1:
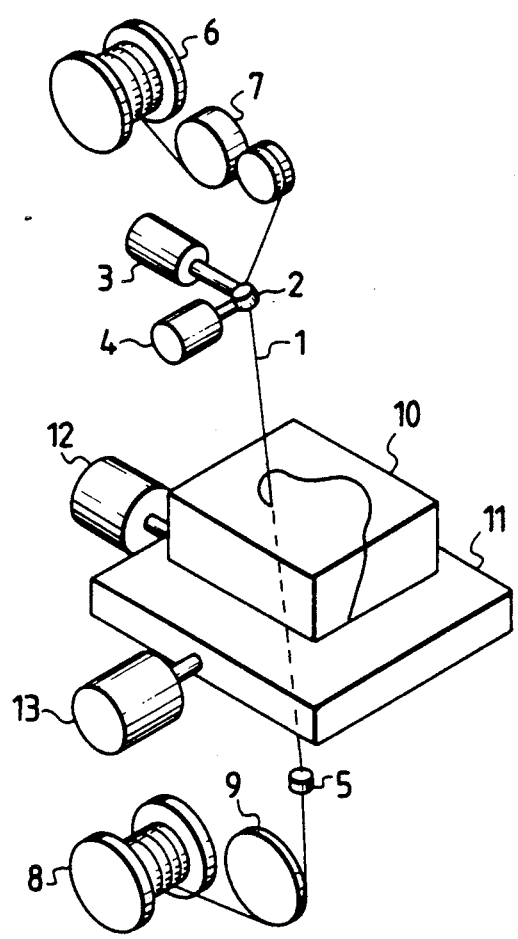
FIG. 1 is a perspective view showing a conventional wire cut electric discharge machining apparatus briefly.
Figure 2A:
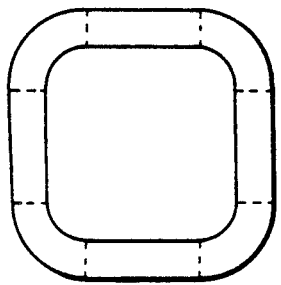
FIG. 2(a) through FIG. 2(c) are schematic diagrams respectively showing a top view, a side view and a perspective view of a workpiece which has been machined according to a conventional taper-machining method for machining a workpiece to a substantially truncated circular cone.
Figure 2B:
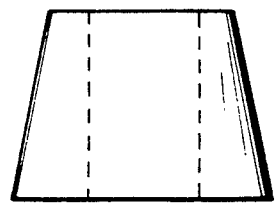
Figure 2C:
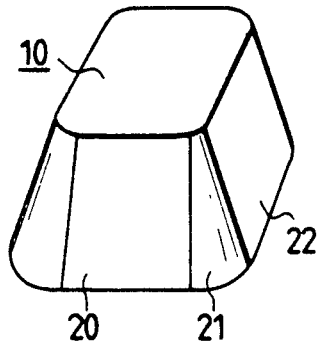
Figure 3A:
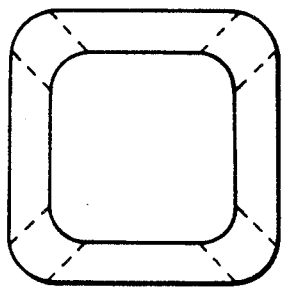
FIG. 3(a) through FIG. 3(c) are schematic diagrams respectively showing a top view, a side view and a perspective view of a workpiece which has been machined according to a conventional taper-machining method for machining a workpiece so as to have the same radius at the corners of the upper and lower surfaces.
Figure 3B:
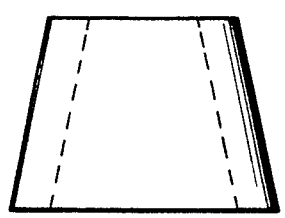
Figure 3C:
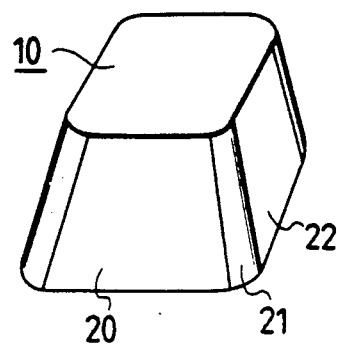
Figure 4:
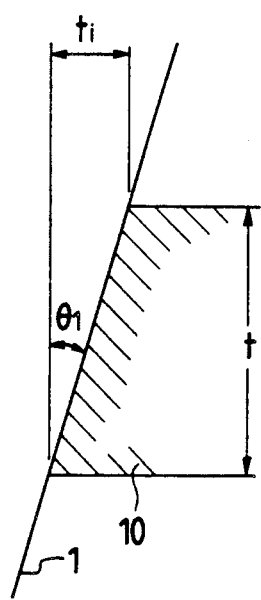
FIG. 4 is a schematic diagram showing a sectional view of a workpiece which is being taper-machined.
Figure 5:
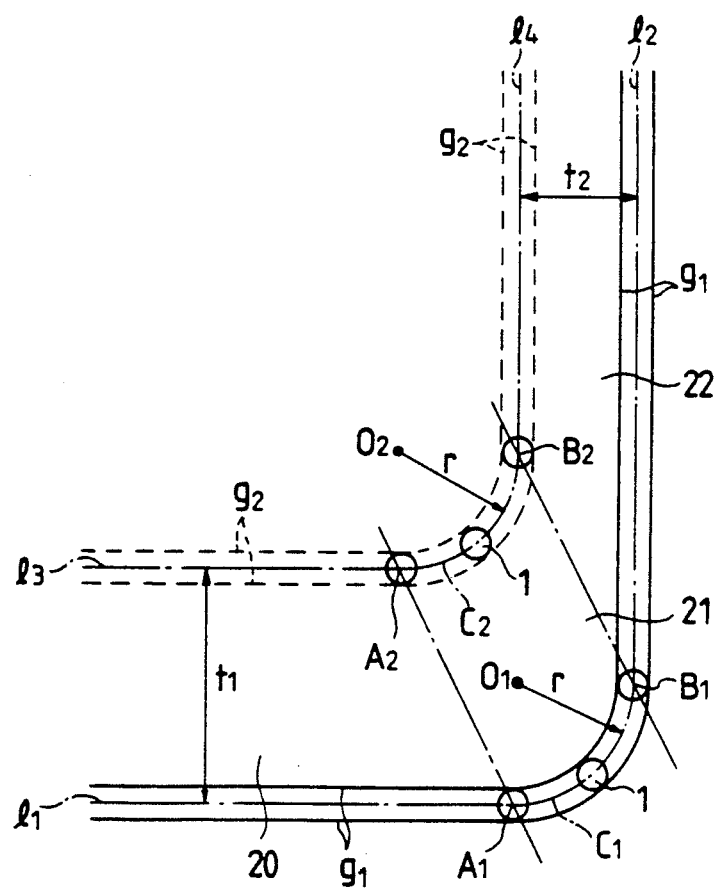
FIG. 5 is an explanatory diagram showing machining loci provided in the above-described conventional method of taper-machining a workpiece so as to have the same radius at the corners of the upper and lower surfaces.
Figure 6:
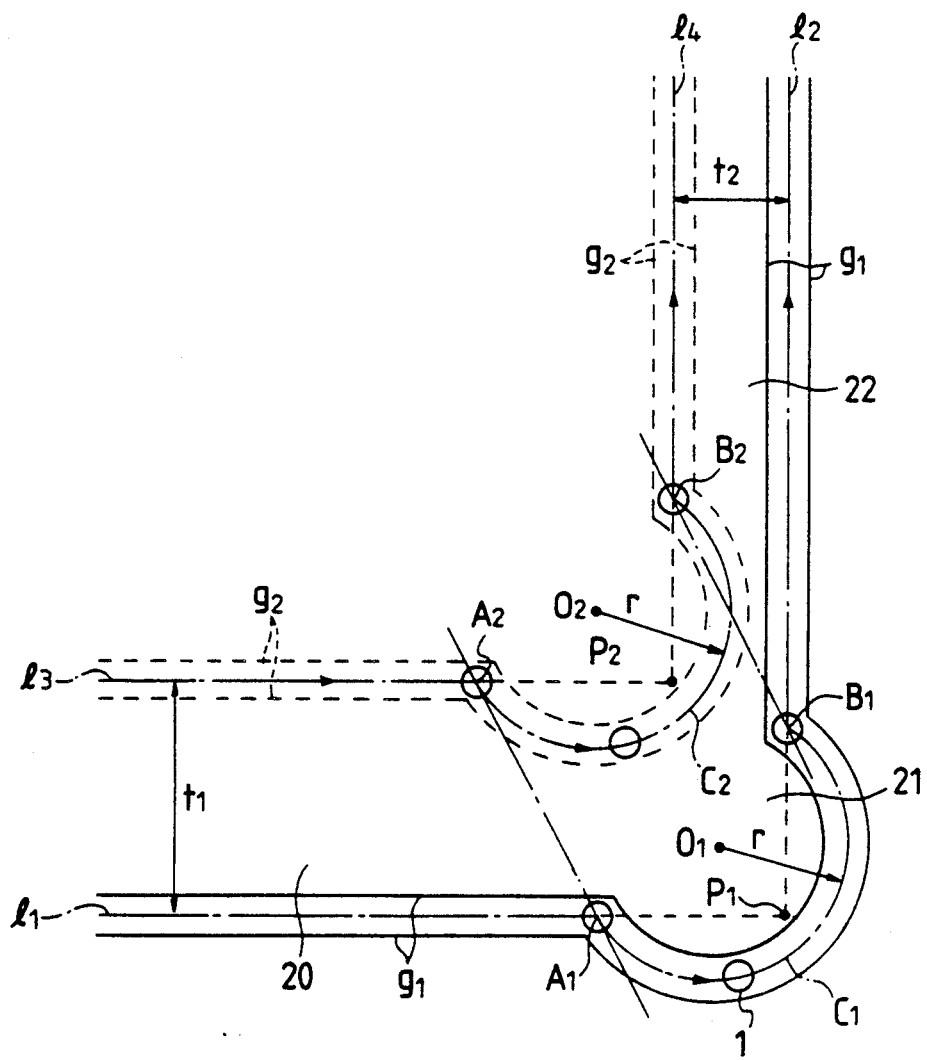
FIG. 6 is an explanatory diagram showing machining loci according to the present invention.

FIG. 6 is a diagram showing machining loci according to the embodiment of the present invention. As shown in FIG. 6, an arcuate part between two straight parts is a non-tangent-circle arc which is not tangent to two straight lines. In FIG. 6, reference numeral 20 designates a first straight part; 21, an arcuate part; 22, a second straight part; and reference character $l_1$ through $l_4$, $c_1$, $c_2$, $g_1$, $g_2$, $O_1$, $O_2$, r, $t_1$ and $t_2$ designate the same parts as those in FIG. 5.

Further in FIG. 6, reference character A designates the end point of the first straight locus $l_1$ (or the start point of the arcuate locus $c_1$); $B_1$, the end point of the arcuate locus $c_1$ in the lower surface of the workpiece (or the start point of the second straight line $l_2$); $A_2$, the end point of the first straight line in the upper surface of the workpiece (or the start point of the arcuate locus $c_2$); and $B_2$, the end point of the arcuate locus $C_2$ (or the start point of the second straight locus $l_4$).

Figure 7:
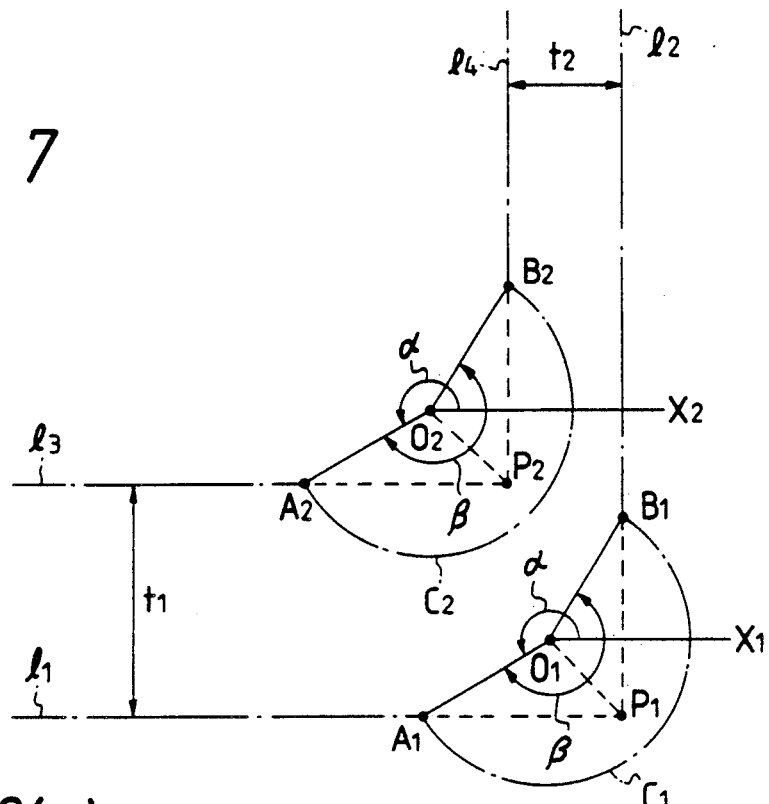
FIG. 7 is an explanatory diagram showing configuration elements extracted from FIG. 6.

FIG. 7 is an explanatory diagram showing configuration elements which are extracted from FIG. 6 for calculation of the machining loci. In FIG. 7, reference character $\alpha$ designates the start angle of the arcuate loci $c_1$ and $c_2$ of the upper and lower surfaces of the workpiece; $\beta$, the open angle of the arcuate loci $c_1$ and $c_2$; and $x_1$ and $x_2$, an X-axis direction provided when FIG. 7 is regarded as an X-Y plane with which the arcuate loci $c_1$ and $c_2$ from the start angle $\alpha$. The remaining reference characters designate the same parts as those in FIG. 6.

Now, the operation of the wire cut electric discharge machining apparatus will be described.

In taper-machining the workpiece to form the first straight part 20, the wire inclined is moved along the first straight loci $l_1$ and $l_3$. More specifically, while the wire inclination angle is being changed gradually, the wire-shaped electrode 1 is moved so that it reaches the end point $A_1$ of the first straight line $l_1$ of the workpiece lower surface and the end point $A_2$ of the first straight line $l_3$ of the workpiece upper surface at the same time. After the wire has reached the end points $A_1$ and $A_2$, with the wire inclination angle maintained unchanged, the wire-shaped electrode 1 is moved to reach the end points $B_1$ and $B_2$ of the arcuate loci $c_1$ and $c_2$. That is, in this operation, the wire-shaped electrode 1 is driven by the X-axis drive unit 12 and the Y-axis drive unit 13 only instead of the U-axis drive unit 3 and the V-axis drive unit 4. Thus, the taper-machining operation for the arcuate part 21 has been accomplished. Thereafter, while the wire inclination angle being changed gradually, the wire-shaped electrode 1 is moved along the machining loci $l_3$ and $l_4$ of the second straight part 22. Thus, the second straight part 22 has been formed.

In order to taper-machining the workpiece in the above-described manner, it is necessary to determine the positions of the points $A_2$ and $B_2$ of the locus and the center $O_2$ in the workpiece upper surface. This will be described in more detail.

First, the machining loci $l_3$ and $l_4$ of the workpiece upper surface are located at the positions which are spaced the taper offsets $t_1$ and $t_2$ from the machining loci $l_1$ and $l_2$, respectively. The intersection $P_1$ of the prolongations of the straight lines $l_1$ and $l_2$ is obtained, and similarly the intersection $P_2$ of the prolongations of the straight lines $l_3$ and $l_4$ is obtained. With a vector $P_1P_2$ directing from $P_1$ to $P_2$, the points $A_2$, $B_2$ and $O_2$ can be located at the positions which are spaced by the scaler quantity of the vector $P_1P_2$ from the points $A_2$, $B_2$ and $O_2$ in parallel with the vector $P_1P_2$. When the points $A_2$, $B_2$ and $O_2$ of the workpiece upper surface are located according to this manner, then the arcuate loci $c_1$ and $c_2$ of the lower and upper surfaces of the workpiece have the same radius r, and they have the same arc start angle $\alpha$ and the same arc open angle $\beta$. This will be described in more detail.

In FIG. 7, a vector $A_1A_2$ and a vector $O_1O_2$ are equal to the vector $P_1P_2$, and thus the points $A_1A_2O_2O_1$ form a parallelogram. Accordingly, a vector $O_1A_1$ is equal to a vector $O_2A_2$. Similarly, the points $B_1B_2O_2O_1$ form a parallelogram, and thus a vector $O_1B_1$ is equal to a vector $O_2B_2$. That is, the arcuate locus $c_1$ of the lower surface of the workpiece is equal to the arcuate locus $c_2$ of the upper surface of the workpiece both in arc start angle $\alpha$ and in arc open angle $\beta$. In addition, the arcuate loci of the upper and lower wire guides 2 and 5 are completely equal to the above-described arcuate loci $c_1$ and $c_2$.

Figure 8A:
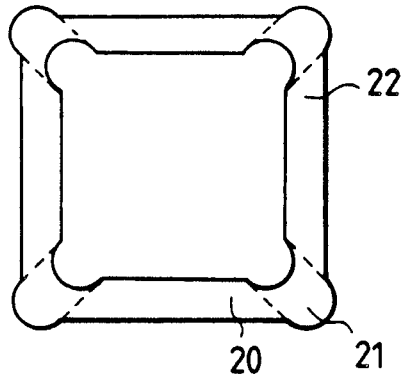
FIGS. 8(a) through 8 (c) are schematic diagrams respectively showing a top view, a side view and a perspective view of a workpiece which has been machined according to the embodiment of the present invention which practices a method of taper-machining a workpiece so as to have the same radius at the corners of the upper and lower surfaces.
Figure 8B:
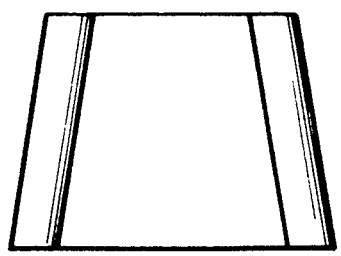
Figure 8C:
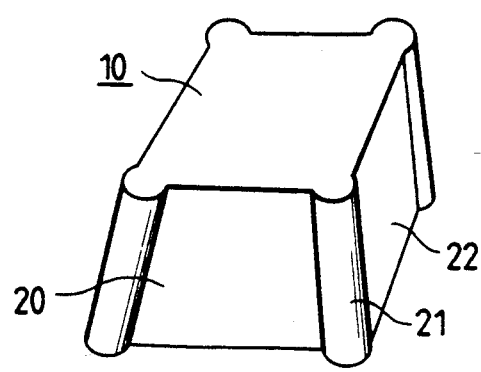

Thus, the arcuate loci $c_1$ and $c_2$ of the workpiece lower and upper surface are equal to each other, and accordingly the workpiece can be taper-machined in such a manner that the corners of the upper and lower surfaces have the same radius R as shown in FIG. 8.

The embodiment has been described with respect to the case where, at a corner of the product, the arcuate part is not tangent to the two straight parts. The two straight parts are not always limitative; that is, the two parts on both sides of the arcuate part may be any ones the prolongations of which provide intersections $P_1$ and $P_2$: for instance, they may be curves (in this case, the intersections can be obtained on the prolongations of the straight lines connecting the ends of the curves). It goes without saying that the arcuate part is a tangent-circle-arc. Furthermore, the technical concept of the invention is applicable to an arc curved inwardly as well as an arc which is curved outwardly as in the case of the above-described embodiment.

In the above-described embodiment, the taper-machining operation is carried out with reference to the machining loci on the lower surface of the workpiece; however, it goes without saying that it can be performed with reference to the machining loci on the upper surface of the workpiece.

As was described above, in the wire cut electric discharge machining method of the invention, not only in the case where an arcuate part between two machining parts is a tangent-circle-arc, but also in the case where it is a non-tangent-circle-arc, with the vector connecting the intersections of the prolongations of the machining loci of the machining parts in the upper and lower surfaces of the workpiece, the connecting points of the machining loci and the arcuate locus of the upper (or lower) surface, and the center of the arcuate locus can be definitely determined by shifting those of the lower (or upper) surface as much as the taper offset, and therefore the wire-shaped electrode can be moved along the arcuate loci of the upper and lower surfaces at the same machining speed. Thus, the second taper-machining operation in which a workpiece is tapered to have the same radius at the corners of the upper and lower surfaces can be readily achieved with high accuracy. As a result, the wire cut electric discharge machining method of the invention can be widely applied to the field of machining parts or the like.

What is claimed is:

1. A wire cut electric discharge machining method in which, with a wire-shaped electrode orientable at wire inclination angles, a workpiece having an upper and lower surface is machined by said wire-shaped electrode extending between said upper and said lower surface to form a first machining part, an arcuate part, and a second machining part in the stated order, comprising the steps of:

obtaining a first intersection of prolongations of first and second machine loci defining said first and second machining parts in a first surface of said upper and lower surfaces of said workpiece;

obtaining first and second machining loci in a second surface of said upper and lower surfaces of said workpiece at positions which are spaced as much as values corresponding to wire inclination angles and the thickness of said workpiece from said first and second machining loci of said first and second machining parts in said first surface, respectively;

obtaining a second intersection of prolongations of said first and second machining loci in said second surface of said workpiece;

obtaining an arcuate locus in said second surface of said workpiece at a position which is spaced from an arcuate locus in said first surface of said workpiece by as much as the scalar quantity of a vector directed from the first intersection to the second intersection and in a direction parallel with said vector;

machining, with the start points and the end points of said arcuate loci in said upper and lower surfaces of said workpiece being referred to each other, said workpiece so that said wire-shaped electrode is moved until said wire-shaped electrode reaches the start points of said arcuate loci at the same time while being gradually inclined, to form said first machining part;

machining said workpiece to form said arcuate part in such a manner that said wire-shaped electrode describes the same arcuate locus both on said upper and lower surface of said workpiece, said wire-shaped electrode being moved until said wire-shaped electrode reaches the end points of said arcuate loci; and machining said workpiece to form said second machining part while said wire-shaped electrode is being gradually inclined.

2. The wire cut electric discharge machining method of claim 1 in which at least one of said first machining part and said second machining part makes a non-tangential intersection with said arcuate part.

3. The wire cut electric discharge machining method of claim 1 in which said electrode is held on opposite sides of said workpiece by upper and lower wire guides and wherein said lower wire guide is moved only under the condition that said upper wire guide position is not changed.

4. The wire cut electric discharge machining method of claim 1, wherein said prolongations of said first and second machining loci comprise straight lines, and said prolongations of said first and second machining loci intersect each other.

* * * * *